(12) United States Patent
Folmar et al.

(10) Patent No.: US 8,940,156 B2
(45) Date of Patent: Jan. 27, 2015

(54) THERMOCHEMICAL STRUCTURING OF MATRIX COMPONENTS FOR FCC CATALYSTS

(75) Inventors: Kenneth Folmar, Macon, GA (US); Mitchell Willis, Bainbridge, GA (US)

(73) Assignee: BASF Corporation, Florham Park, NJ (US)

( * ) Notice: Subject to any disclaimer, the term of this patent is extended or adjusted under 35 U.S.C. 154(b) by 574 days.

(21) Appl. No.: 13/042,808

(22) Filed: Mar. 8, 2011

(65) Prior Publication Data

US 2012/0228194 A1    Sep. 13, 2012

(51) Int. Cl.
| | |
|---|---|
| C10G 11/00 | (2006.01) |
| B01J 35/02 | (2006.01) |
| B01J 21/00 | (2006.01) |
| B01J 27/18 | (2006.01) |
| B01J 29/04 | (2006.01) |
| B01J 29/08 | (2006.01) |
| B01J 29/83 | (2006.01) |
| B01J 35/00 | (2006.01) |
| B01J 37/00 | (2006.01) |
| B01J 37/06 | (2006.01) |
| B01J 37/08 | (2006.01) |
| B01J 35/10 | (2006.01) |

(52) U.S. Cl.
CPC ............. *B01J 35/023* (2013.01); *B01J 21/005* (2013.01); *B01J 27/18* (2013.01); *B01J 29/04* (2013.01); *B01J 29/084* (2013.01); *B01J 29/83* (2013.01); *B01J 35/002* (2013.01); *B01J 37/0045* (2013.01); *B01J 37/06* (2013.01); *B01J 37/08* (2013.01); *B01J 35/1009* (2013.01); *B01J 35/1019* (2013.01); *B01J 35/1038* (2013.01); *B01J 2229/16* (2013.01); *B01J 2229/37* (2013.01); *B01J 2229/42* (2013.01); *B01J 2229/64* (2013.01)
USPC .......................................................... 208/113

(58) Field of Classification Search
CPC .......... B01J 35/023; B01J 27/18; B01J 37/06; B01J 29/83; B01J 29/084; B01J 37/0045; B01J 37/08; B01J 21/005; B01J 29/04; B01J 35/002; B01J 2229/16; B01J 2229/37; B01J 35/1019; B01J 35/1038; B01J 2229/64; B01J 2229/42; B01J 35/1009
USPC ....................................... 502/208, 80, 63, 60
See application file for complete search history.

(56) References Cited

U.S. PATENT DOCUMENTS 3,867,279 A    2/1975    Young
(Continued)

OTHER PUBLICATIONS http://www.potashcorp.com/media/POT_SS_(Jan. 2011), 2 pages.*

(Continued)

*Primary Examiner* — Randy Boyer
*Assistant Examiner* — Juan Valencia
(74) *Attorney, Agent, or Firm* — Melanie L. Brown

(57) ABSTRACT

A catalyst particle which comprises a metallic oxide such as kaolin is provided with the unique structure by mixing small amounts of a polyphosphate structuring agent with the metallic oxide and heating the mixture of metallic oxide and polyphosphate to allow reaction of the structuring agent with the metallic oxide.

21 Claims, 6 Drawing Sheets

(56) References Cited

U.S. PATENT DOCUMENTS

| | | | | |
|---|---|---|---|---|
| 4,493,902 | A | * | 1/1985 | Brown et al. ............ 502/65 |
| 7,273,827 | B2 | | 9/2007 | Chang et al. |
| 7,456,123 | B2 | * | 11/2008 | Wachter ............ 502/60 |
| 2005/0032934 | A1 | | 2/2005 | Muenzenberger et al. |
| 2008/0293561 | A1 | * | 11/2008 | Long et al. ............ 502/65 |

OTHER PUBLICATIONS

Leikam, Dale F., "Storage and Handling Characteristics of Ammonium Polyphosphate Solution", Fluid Fertilizer Foundation, Apr. 24, 2008, 2 pgs.

* cited by examiner

THERMOCHEMICAL STRUCTURING OF MATRIX COMPONENTS FOR FCC CATALYSTS

BACKGROUND OF THE INVENTION

Since the 1960's, most commercial fluid catalytic cracking catalysts have contained zeolites as an active component. Such catalysts have taken the form of small particles, called microspheres, containing both an active zeolite component and a non-zeolite component. Frequently, the non-zeolitic component is referred to as the matrix for the zeolitic component of the catalyst. The non-zeolitic component is known to perform a number of important functions, relating to both the catalytic and physical properties of the catalyst. Oblad described those functions as follows: "The matrix is said to act as a sink for sodium in the sieve thus adding stability to the zeolite particles in the matrix catalyst. The matrix serves the additional function of: diluting the zeolite; stabilizing it towards heat and steam and mechanical attrition; providing high porosity so that the zeolite can be used to its maximum capacity and regeneration can be made easy; and finally it provides the bulk properties that are important for heat transfer during regeneration and cracking and heat storage in large-scale catalytic cracking." A. G. Oblad Molecular Sieve Cracking Catalysts, The Oil And Gas Journal, 70, 84 (Mar. 27, 1972).

In prior art fluid catalytic cracking catalysts, the active zeolitic component is incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

It has long been recognized that for a fluid catalytic cracking catalyst to be commercially successful, it must have commercially acceptable activity, selectivity, and stability characteristics. It must be sufficiently active to give economically attractive yields, it must have good selectivity towards producing products that are desired and not producing products that are not desired, and it must be sufficiently hydrothermally stable and attrition resistant to have a commercially useful life.

U.S. Pat. No. 4,493,902, the teachings of which are incorporated herein by cross-reference is directed to the above-mentioned in-situ technique for providing a zeolite-containing FCC catalyst. This patent discloses novel fluid cracking catalysts comprising attrition-resistant, high zeolitic content, catalytically active microspheres containing more than about 40%, preferably 50-70% by weight Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe than those used to convert kaolin to metakaolin, i.e., kaolin clay calcined to undergo the characteristic kaolin exothermic reaction, sometimes referred to as the spinel form of calcined kaolin. In a preferred embodiment, the microspheres containing the two forms of calcined kaolin clay are immersed in an alkaline sodium silicate solution, which is heated, preferably until the maximum obtainable amount of Y faujasite is crystallized in the microspheres.

In practice of the '902 technology, the porous microspheres in which the zeolite is crystallized are preferably prepared by forming an aqueous slurry of powdered raw (hydrated) kaolin clay ($Al_2O_3:2SiO_2:2H_2O$) and powdered calcined kaolin clay that has undergone the exotherm together with a minor amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin clay and kaolin calcined to undergo the exotherm are then calcined under controlled conditions, less severe than those required to cause kaolin to undergo the exotherm, in order to dehydrate the hydrated kaolin clay portion of the microspheres and to effect its conversion into metakaolin, this resulting in microspheres containing the desired mixture of metakaolin, kaolin calcined to undergo the exotherm and sodium silicate binder. In illustrative examples of the '902 patent, about equal weights of hydrated clay and spinel are present in the spray dryer feed and the resulting calcined microspheres contain somewhat more clay that has undergone the exotherm than metakaolin. The '902 patent teaches that the calcined microspheres comprise about 30-60% by weight metakaolin and about 40-70% by weight kaolin characterized through its characteristic exotherm. A less preferred method described in the patent, involves spray drying a slurry containing a mixture of kaolin clay previously calcined to metakaolin condition and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated from the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology. Refineries whose FCC units are limited by the maximum tolerable regenerator temperature or by air blower capacity seek selectivity improvements resulting in reductions in coke make while the gas compressor limitations make catalysts that reduce gas make highly desirable. Seemingly a small reduction in coke can represent a significant economic benefit to the operation of an FCC unit with air blower or regenerator temperature limitations.

Improvements in cracking activity and gasoline selectivity of cracking catalysts do not necessarily go hand in hand. Thus, a cracking catalyst can have outstandingly high cracking activity, but if the activity results in a high level of conversion to coke and/or gas at the expense of gasoline the catalyst will have limited utility. Catalytic cracking activity in present day FCC catalysts is attributable to both the zeolite and non-zeolite (e.g., matrix) components. Zeolite cracking tends to be gasoline selective. Matrix cracking tends to be less gasoline selective. After appropriate ion-exchange treatments with rare earth cations, high zeolite content microspheres produced by the in situ procedure described in the '902 patent are both highly active and highly gasoline selective. As zeolite content of these unblended microspheres is increased, both activity and selectivity tend to increase. This may be explained by the decrease in matrix content with increase in zeolite content and the decreasingly prominent role of non-selective matrix cracking. Thus, increases in the zeolite content of the high zeolite content microspheres have been reported to be highly desirable.

The activity and selectivity characteristics of the catalysts formed by the process of the '902 patent are achieved even though, in general, the catalysts have relatively low total porosity as composed to fluid catalytic cracking catalysts prepared by incorporating the zeolite content into a matrix. In particular, the microspheres of such catalysts, in some cases, have a total porosity of less than about 0.15 cc/g. or even less than about 0.10 cc/g. In general, the microspheres of the '902 patent have a total porosity of less than 0.30 cc/g. As used herein, "total porosity" means the volume of pores having diameters in the range of 35-20,000 Angstroms, as determined by the mercury porosimetry technique. The '902 patent noted that it was surprising that microspheres having a total porosity of less than about 0.15 cc/g. exhibit the activity and selectivity characteristics found. For example, such a result is contrary to the prior art disclosures that low pore volumes "can lead to selectivity losses due to diffusional restrictions."

It is believed that the relatively low porosity of the catalyst microspheres formed as in the '902 patent does not adversely effect activity and selectivity characteristics, since the microspheres of the '902 patent are not diffusion limited relative to the typical FCC processing conditions which were used at the time of the patent. In particular, catalyst contact time with the feed to be cracked was typically 5 seconds or more. Thus, while typical FCC catalysts formed by mechanically incorporating the zeolite within a matrix may have been more porous, the reaction time in prior art FCC risers did not yield any advantage in activity or selectivity. This result inspired the conclusion that transport processes were not at all limiting in FCC catalysts, at least outside the zeolite structure. Assertions made to the contrary were inconsistent with the facts and easily dismissed as self-serving. Importantly, the attrition resistance of the microspheres prepared in accordance with the '902 patent was superior to the conventional FCC catalysts in which the crystallized zeolite catalytic component was physically incorporated into the non-zeolitic matrix.

Recently, however, FCC apparatus have been developed which drastically reduce the contact time between the catalyst and the feed which is to be cracked. Conventionally, the reactor is a riser in which the catalyst and hydrocarbon feed enter at the bottom of the riser and are transported through the riser. The hot catalyst effects cracking of the hydrocarbon during the passage through the riser and upon discharge from the riser, the cracked products are separated from the catalyst. The catalyst is then delivered to a regenerator where the coke is removed, thereby cleaning the catalyst and at the same time providing the necessary heat for the catalyst in the riser reactor. The newer riser reactors operate at lower residence time and higher operating temperatures to minimize coke selectivity and delta coke. Several of the designs do not even employ a riser, further reducing contact time to below one second. Gasoline and dry gas selectivity can improve as a result of the hardware changes. These FCC unit modifications are marketed as valuable independent of the type of catalyst purchased, implying an absence of systematic problems in state of the art catalyst technology.

The processing of increasingly heavier feeds in FCC type processes and the tendency of such feeds to elevate coke production and yield undesirable products have also led to new methods of contacting the feeds with catalyst. The methods of contacting FCC catalyst for very short contact periods have been of particular interest. Thus, short contact times of less than 3 seconds in the riser, and ultra short contact times of 1 second or less have shown improvements in selectivity to gasoline while decreasing coke and dry gas production.

To compensate for the continuing decline in catalyst to oil contact time in FCC processing, the "equilibrium" catalysts in use have tended to become more active. Thus, increases in the total surface area of the catalyst need to be achieved and as well, the level of rare earth oxide promoters added to the catalysts are increasing. Moreover, cracking temperatures are rising to compensate for the reduction in conversion. Unfortunately, it has been found that the API gravity of the bottoms formed during short contact time (SCT) often increases after a unit revamp, leading some to suggest that the heaviest portion of the hydrocarbon feed takes longer to crack. Further, while a high total surface area of the catalyst is valued, the FCC process still values attrition resistance. Accordingly, optimization of FCC catalysts for the new short contact time and ultra short contact time processing which is presently being used is needed.

It is now theorized, that under the short contact time processing of hydrocarbons, that further improvements can be gained by eliminating diffusion limitations that may still exist in current catalysts. This is being concluded even as these materials excel at the application. It is theorized that improvements in these catalysts may be produced by optimization of catalyst porosity and the elimination of active site occlusion and diffusional restrictions of the binder phases present in catalysts prepared by the so-called incorporation method.

As disclosed in commonly assigned U.S. Pat. No. 6,943,132, novel zeolite microspheres are formed which are macroporous, have sufficient levels of zeolite to be very active and are of a unique morphology to achieve effective conversion of hydrocarbons to cracked gasoline products with improved bottoms cracking under SCT FCC processing. The novel zeolite microspheres of the invention are produced by novel processing, which is a modification of technology described in U.S. Pat. No. 4,493,902. It has been found that if the non-zeolite, alumina-rich matrix of the catalyst is derived from an ultrafine hydrous kaolin source having a particulate size such that 90 wt. % of the hydrous kaolin particles are less than 2 microns, and which is pulverized and calcined through the exotherm, a macroporous zeolite microsphere can be produced. More generally, the FCC catalyst matrix useful in this invention to achieve FCC catalyst macroporosity is derived from alumina sources, such as kaolin calcined through the exotherm, that have a specified water pore volume, which distinguishes over prior art calcined kaolin used to form the catalyst matrix.

The morphology of the microsphere catalysts which are formed in accordance with U.S. Pat. No. 6,943,132 is unique relative to the in-situ microsphere catalysts formed previously. Use of a pulverized, ultrafine hydrous kaolin calcined through the exotherm yields in-situ zeolite microspheres having a macroporous structure in which the macropores of the structure are essentially coated or lined with zeolite subsequent to crystallization. Macroporosity as defined herein means the catalyst has a macropore volume in the pore diameter range of 600-20,000 Angstroms of at least 0.07 cc/gm mercury intrusion. The novel catalyst is optimal for FCC processing, including the short contact time processing in which the hydrocarbon feed is contacted with a catalyst is for times of about 3 seconds or less.

In the broadest sense, the matrix disclosed in U.S. Pat. No. 6,943,132 is not restricted to macroporous catalysts having a non-zeolite matrix derived solely from kaolin. Thus, any alumina source which has the proper combinations of porosity and reactivity during zeolite synthesis and can generate the desired catalyst macroporosity and morphology can be used. An FCC catalyst under the tradename Naptha-Max® and prepared in accordance with U.S. Pat. No. 6,943,132 has found vast commercial success.

Aluminas have long been used in hydrotreating and reforming catalyst technology (see P. Grange in Catalysis Reviews—Science and Engineering, Vol. 21, 1980, p. 135). Aluminas, and particularly transition aluminas, in addition to displaying acidic character also posses high surface areas typically on the order of several hundred meters squared per gram. They may be well suited for catalyst applications where a metallic component is to be supported on the substrate surface (alumina in this case). The high surface area of the host material above allows for a more uniform, dispersed arrangement of the metal. This leads to smaller metal crystallites and helps to minimize metal agglomeration. Metal agglomeration or sintering is a leading cause of loss of activity since the activity for metal catalyzed reaction is proportional to the exposed metal surface area. When the metal sinters metallic surface area is lost and so is activity. In relation to catalytic cracking, despite the apparent disadvantage in selectivity, the inclusion of aluminas or silica-alumina has been beneficial in certain circumstances. For instance when processing a hydrotreated/demetallated vacuum gas oil (hydrotreated VGO) the penalty in non-selective cracking is offset by the benefit of cracking or "upgrading" the larger feed molecules which are initially too large to fit within the rigorous confines of the zeolite pores. Once "precracked" on the alumina or silica-alumina surface, the smaller molecules may then be selectively cracked further to gasoline material over the zeolite portion of the catalyst. While one would expect that this precracking scenario might be advantageous for resid feeds they are unfortunately characterized for the most part as being heavily contaminated with metals such as nickel and vanadium and to a lesser extent, iron. When a metal such as nickel deposits on a high surface area alumina such as those found in typical FCC catalysts, it is dispersed and participates as highly active centers for the catalytic reactions which result in the formation of contaminant coke (contaminant coke refers to the coke produced discretely from reactions catalyzed by contaminant metals). This additional cokes exceeds that which is acceptable by refiners.

Loss of activity or selectivity of the catalyst may also occur if the metal contaminants such as nickel, vanadium, from the hydrocarbon feedstock, deposit onto the catalyst. These metal contaminants are not removed by standard regeneration (burning) and contribute markedly to undesirably high levels of hydrogen, dry gas and coke and reduce significantly the amount of gasoline that can be made. Contaminant metal levels are particularly high in certain feedstocks, especially the more abundant heavier crudes. As oil supplies dwindle, successful economic refining of these heavier crudes becomes more urgent. In addition to reduced amounts of gasoline, these contaminant metals contribute to much shorter life cycles for the catalyst and an unbearably high load on the vapor recovery system. Deposited nickel and vanadium species have an intrinsic dehydrogenation activity which leads to the formation of coke and gas, two undesirable products. Furthermore, vanadium assists in destroying the crystallinity of the sieve. This leads to a loss of catalytic activity and to the formation of certain silica-alumina species which tend to promote the formation of coke and gas. The increased expense of refining metal-contaminated feedstocks due to the aforementioned factors lays a heavy economic burden on the refiner. Therefore, much effort has been spent in finding means to modify the catalyst or feedstock in such a way as to passivate the aforementioned undesirable effects of the metal contaminants.

Commonly assigned U.S. Pat. No. 5,559,067 addresses the problem of providing a resid FCC catalyst made by the in-situ route which can upgrade bottoms, minimize coke and gas formation, maximize catalyst stability and minimize deleterious contaminant selectivity due to contaminant metals. The resid FCC catalyst of the patent achieves metal tolerance in a manner considered to be relatively inexpensive to practice and does not result in the use of environmentally toxic additives such as the use of prior art technologies for achieving metals tolerance such as those involving the use of antimony. In accordance with the patent, microspheres comprising hydrous kaolin clay, gibbsite (alumina trihydrate), spinel, and a silica sol binder are prepared, the microspheres calcined to convert the hydrous kaolin component to metakaolin and the calcined microspheres reacted with an alkaline sodium solution into crystallized zeolite Y and ion exchanged.

During the conversion of hydrous kaolin to metakaolin, gibbsite also undergoes transformation to a transition alumina. Transition alumina may be defined as any alumina which is intermediate between the thermodynamically stable phases of gibbsite, bayerite, boehmite, and nordstandite on one end of the spectrum and alpha alumina or corrundum on the other. Such transition aluminas may be viewed as metastable phases. A scheme of the transformation sequence can be found in the text: Oxides and Hydroxides of Aluminum by K. Wefers and C. Misra; Alcoa Technical Paper No. 19, revised; copyright Aluminum Company of America Laboratories, 1987.

In commonly assigned U.S. Pat. No. 6,716,338, a novel, in-situ fluid cracking catalyst is provided which is useful in cracking feeds that contain nickel and vanadiaum. The FCC catalyst of this invention is made from microspheres which initially contain kaolin, binder, and a dispersible boehmite alumina. The microsphere is subsequently converted using standard in-situ Y zeolite growing procedures to make a Y-containing catalyst. Exchanges with ammonium and rare earth cations with appropriate calcinations provides an FCC catalyst that contains a transitional alumina obtained from the boehmite.

In commonly assigned U.S. Pat. No. 6,673,235, a novel, high pore volume in-situ fluid cracking catalyst is provided which is useful in cracking feeds that contain nickel and vanadium. The FCC catalyst of this patent is made from microspheres, which initially contain kaolin, binder, and a matrix derived from a dispersible boehmite alumina and an ultra fine hyrdrous kaolin having a particulate size such that 90 Wt % of the hydrous kaolin particle are less than 2 microns, and which is pulverized and calcined through the exotherm. The microsphere is subsequently converted using standard in-situ Y zeolite growing procedures to make a Y-containing catalyst. Exchanges with ammonium and rare earth cations with appropriate calcinations provides an FCC catalyst that contains a transitional alumina obtained from the boehmite and a catalyst of a unique morphology to achieve effective conversion of hydrocarbon to cracked gasoline products with improved bottoms cracking under SCT FCC processing. Boehmite-containing FCC catalysts have been commercialized by the present Assignee under the tradename FLEXTECH®. These have been successful in cracking resid feedstocks.

In general, it has been found important to control the pore size of the matrix component in an FCC catalyst, especially for short contact time FCC processing and, in particular, for processing the heavier crudes which are available. At the same time, it is necessary that that the attrition resistance of the FCC particulate catalyst be maintained so that the life of the catalyst can be prolonged as it is cycled through the cracking and regeneration stages of the refining process. To maintain attrition resistance, it would be most useful to convert most of the kaolin matrix component to mullite during calcination at temperatures beyond the kaolin exotherm. Unfortunately, the calcination of kaolin at high temperature to a mullite phase, can drastically reduce the pore volume of the matrix component. In fact, in aforementioned U.S. Pat. No. 6,943,132, it is suggested that the formation of the mullite phase be limited. Similarly, the conversion of an alumina such as boehmite to a transitional phase and then an alpha alumina phase drastically reduces the pore volume within the alumina matrix component.

SUMMARY OF THE INVENTION

It has now been found that metallic oxides which have been used as matrix materials for FCC catalysts, when treated with small amounts of polyphosphate and then heated, are unexpectedly provided with internal structuring so as to increase the internal porosity of the oxide. Metallic oxides which can change crystalline phases upon heating when so treated, can maintain internal pore volume during the phase change and even as the hardness of the metallic oxide increases during heat treatment.

DETAILED DESCRIPTION OF THE INVENTION

Figure 1:
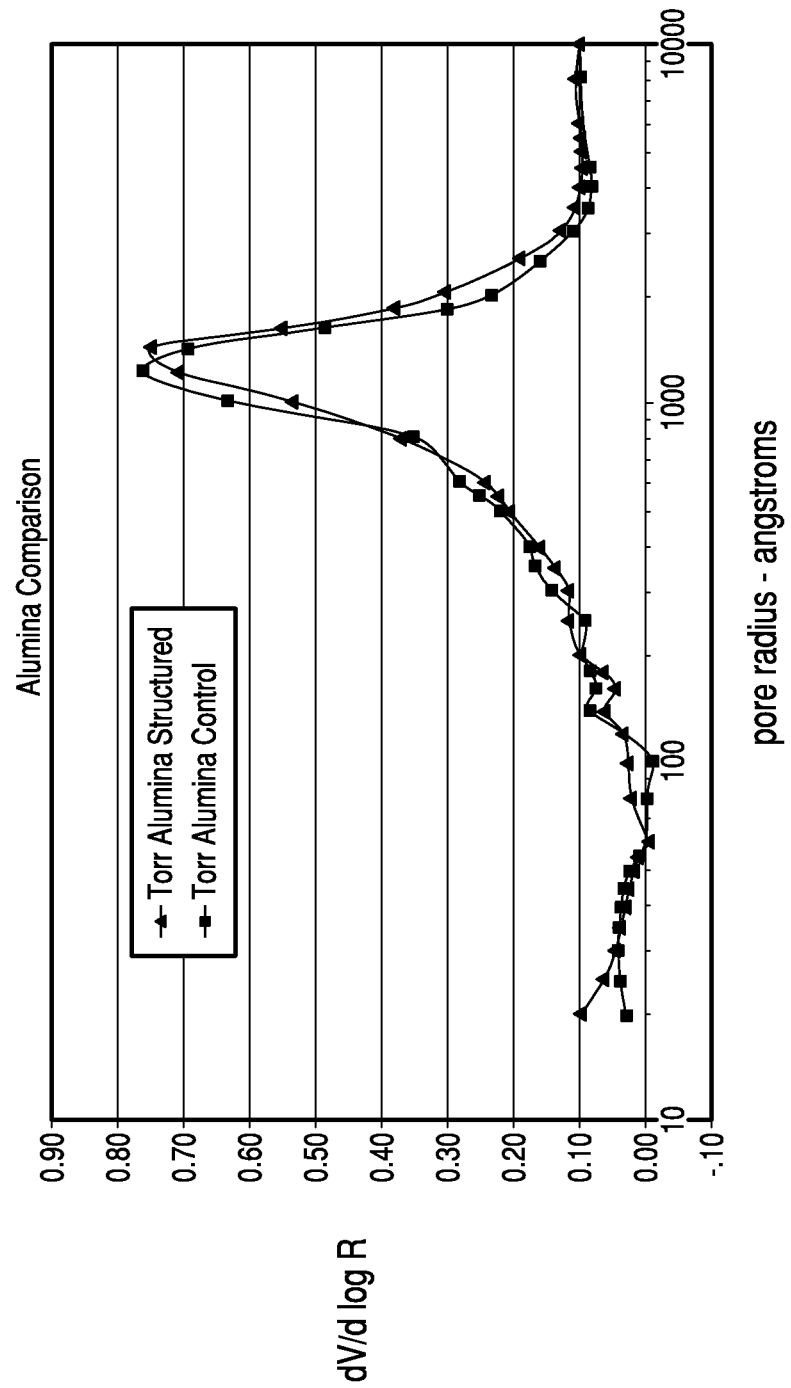
FIG. 1 is a graph illustrating the distribution of pore volume of a boehmite control versus a structured boehmite in accordance with the present invention.

The materials that can be treated in accordance with this invention are metallic oxides which typically have been used as matrix materials for FCC catalysts, in particular, FCC catalysts which contain a zeolite active component. Most of these metallic oxides are materials which will change crystalline phases upon heating. Non-limiting examples include alumina, and alumina-silica materials, in particular, clays. The invention is particularly useful for treating and providing internal structuring to calcined kaolin and aluminas that are transformed to transitional crystalline phases by heating.

The structuring agent which is used in the invention is a polyphosphate, whether as a solid polyphosphate salt or liquid polyphosphate such as ammonium polyphosphate. There does not appear to be any criticality in the length of the polyphosphate chain and, accordingly, di-polyphosphates, tri-polyphosphates, and higher polyphosphate chains to a thousand or more are useful in this invention. Mixtures of polyphosphate and orthophosphates such as phosphoric acid are possible, as long as the amount of the orthophosphoric acid component is not excessive. Preferably, the orthophosphoric acid content should not be greater than 50 wt. % of any structuring mixture with one or more polyphosphates. The amount of orthophosphate or orthophosphoric acid is to be minimized inasmuch as many, if not all, of the anionically dispersed metallic oxides will flocculate in the presence of phosphoric acid, and not provide the structuring effect found. Flocculation also greatly hinders the processing of these materials. A particularly preferred class of structuring agents is the ammonium polyphosphates which are often soluble in water and are liquid so as to be easily processed with aqueous slurries of the metallic oxides to be treated. Of particular usefulness is a liquid ammonium phosphate 11-37-0 fertilizer, which has a polyphosphate content of 37% and an orthophosphate content of 27%. This material is 100% water soluble.

The amount of polyphosphate structuring agent added to the metallic oxide to be treated to provide internal structuring, is minimal. Thus, amounts of polyphosphate as $P_2O_5$ added relative to metallic oxide solids can range from as little as 0.01 to 5 wt. %. More specifically, amounts of polyphosphate as $P_2O_5$ will range from about 0.01 to 2 wt. % and, more particular still, from about 0.01 to 0.5 wt. %. It has been found that even these small amounts of polyphosphate can provide significant changes in surface area and internal pore volume of the metallic oxide treated relative to untreated materials.

In general, the process of treating the metallic oxide to add internal structuring thereto includes slurrying the oxide in water and mixing the polyphosphate structuring agent in liquid form with the aqueous metallic oxide slurry. A slurry dispersant can be included such as sodium hydroxide, sodium carbonate, sodium polyacrylate, sodium silicate, tetra-sodium pyrophosphate, sodium metasilicate, sodium hexametaphosphate, and/or sodium tri-polyphosphate. As above noted, certain polyphosphates such as ammonium polyphosphate are in liquid form and can be simply added to the slurry. Other polyphosphate salts may need to be dissolved in a solvent. Inasmuch as the mixture is spray dried under vacuum or heating and a further heating step is usually required to provide structuring, the solvent, while preferably being water, can be an organic solvent which will vaporize either during the spray drying process and be completely removed during any subsequent heating process.

Spray drying the slurry mixture yields particulate mixtures of the metallic oxide and polyphosphate structuring agent. Moisture content is reduced below 5.0 wt. %, typically, below 2.0 wt. %. Subsequent to spray drying, a pulverization step to crush the spray dried particles can be useful in providing a uniform mixture of the metallic oxide and structuring agent. Spray dried beads may also be processed to form catalyst substrates and precursors, as well as speciality co-catalysts for fluidization control, or impurity trapping, when a bead morphology is required. Subsequent heating results in the reaction of the polyphosphate with the metallic oxide and the formation of new internal structure within the oxide, providing additional pore volume and a higher surface area. Further heating to consolidate the material results in additional hardness and with the new added pore volume, the surface area of the treated oxide is not as drastically reduced, as in untreated materials. It is to be understood that while spray drying is preferably used to form a mixture of the metallic oxide to be treated and the polyphosphate structuring agent, other mixing techniques can be used, as is well known in the mixing art. Other drying techniques can be used, for example, spray granulator, ultrasonic atomization, Lamrot atomizer, etc.

The process of this invention can now be more specifically described for the treatment of hydrous kaolin to be used in catalysts such as FCC cracking catalysts. It is to be understood that the process, while essentially similar for all other types of metallic oxides to be treated, may have certain details which differ from the treatment of kaolin. Hydrous kaolin particles approximately 0.20 to 10 microns in diameter are slurried with water in a solid range of 30 to 80 wt. %, as limited by process viscosity. More typically, the slurry will comprise 40-70% by weight hydrous kaolin solids and, still further, 50 to 65% by weight kaolin solids in water. Room temperature slurries can be prepared, although the slurry can be heated up to 150° F. if desired prior to entering the spray dryer. Mixed with the aqueous kaolin slurry is a polyphosphate, for example, a liquid ammonium polyphosphate, for example, fertilizer grade ammonium polyphosphate (11-37-0). Approximately, 0.01 to 5 wt. % of the ammonium polyphosphate as $P_2O_5$ can be mixed with the aqueous kaolin slurry relative to the kaolin solids. More preferably, the amount of polyphosphate structuring agent would be in the lower portion of the stated range, typically from about 0.01 to 0.2 wt. % $P_2O_5$ relative to the kaolin solids. The mixture of the aqueous hydrous kaolin slurry and liquid ammonium polyphosphate is now spray dried in conventional spray drying equipment. Spray drying can be done in a vacuum or at atmospheric pressure at temperatures between about 70° F. to 550° F. to remove the water.

The size of the spray dried particles comprising the mixture of metallic oxides such as hydrous kaolin, alumina, etc., or mixtures thereof with ammonium polyphosphate will generally range from about 20 to 200 microns. Prior to heating the spray dried particle mixture to induce the structuring reactions, it may be useful to pulverize the spray dried particles into a powder to provide a more uniform mixture of the ammonium polyphosphate and metallic oxide. The mixture can then be heated in air in any calcining furnace. As the temperature is raised, the ammonium polyphosphate decomposes at or above 350° F. The decomposition products are predominately polyphosphoric and orthophosphoric acid. As heating continues, the metallic oxide will be converted to a different crystalline form. For example, with respect to kaolin, the hydrous kaolin is converted to metakaolin at which time the alumina in the kaolin lattice becomes chemically active. Phosphate materials react with the aluminum sites in the kaolin to form new structuring within the kaolin particle. It is believed that the incremental structure within the kaolin particle is likely created, due to the polyphosphoric acid reacting with the chemically active aluminum present while the products are in the metakaolin phase.

The low temperature decomposition of polyphosphates affords a structuring reaction to take place when kaolin transitions into the metakaolin phase. There are unexpected benefits to a process that effectively extends the art of kaolin calcination. The first benefit is the creation of incremental surface area and pore volume in the kaolin lattice. This degree of structuring can be controlled making the lattice more absorbent. Second, the polyphosphate reaction driving structuring is at low temperature, well below the threshold temperature where metakaolin undergoes lattice reconfiguration to spinel and mullite. The newly created structure can serve as a sink to collect the silica expelled as metakaolin transitions to spinel and mullite with incremental heat treatment. This advantage significantly enhances the control capability of the calcination process and can leverage the use of fluxes i.e. sodium silicate, sodium borate, etc which can be used to lower the temperature at which the spinel and mullite transitions take place to produce unique lattice structures.

The kaolin is then heated to a temperature beyond the characteristic exotherm to form the spinel and mullite phases. It is hypothesized that the new structure that is formed during conversion to metakaolin is sufficient to trap some or all of the silica that is expelled as the kaolin is converted into the spinel and mullite phases. Unexpectedly, this essentially eliminates the formation of large +325 mesh agglomerates in the calcined product. This allows the intensive calcination of kaolin to a mullite phase without the customary development of excessive +325 mesh aggregates. The Mohs hardness of the calcined kaolin product can therefore be raised from the customary 4.5 range to 6.5 without agglomerate formation. Importantly, pore volume within the kaolin is not as drastically reduced relative to untreated kaolin that is converted to a significant mullite phase.

It is to be understood that the process of forming a structured kaolin particle or bead can be basically followed with other metallic oxides. In particular, alumina as discussed previously has been used as a catalyst as well as a catalyst support and can be treated with the polyphosphate in a manner which follows the basic procedure as described above with respect to kaolin. Importantly, it has been found advantageous to provide mixtures of structured alumina and structured kaolin, as well as structured alumina and kaolin. As previously discussed, the addition of a dispersed boehmite in an FCC catalyst has been found useful in the cracking of resid or resid-containing feeds, as the calcined dispersible boehmite passivates nickel and vanadium contaminants contained in such feeds. Thus, the mixture of alumina and kaolin can be a mixture of structured powders, a mixture of structured alumina and kaolin powders, or a spray dried bead of such mixtures which are then calcined to obtain a structured final product. Such structured products may be useful even without a zeolite catalyst as an additive for metals passivation or control of cracking activity.

The structured metallic oxides which have been reacted with the polyphosphate as described above are useful for incorporation into catalytic materials, including FCC catalysts. The structured metallic oxides have increased pore volume relative to the hardness of the materials, with respect to the untreated metallic oxides. Thus, porosity of the catalysts can be maintained while the attrition resistance of the catalyst is improved. As will be shown below in the examples, other improvements with respect to catalyst formation and use result upon the incorporation of structured metallic oxides into the FCC catalyst. The structured metallic oxides of this invention have use in FCC catalysts, which are formed by either the incorporation method or by the in-situ method. In general, such catalysts have an average particle size of between 20 and 200 microns, and include a matrix which would include the structured metallic oxides and, a catalytically active zeolite. Often, a binder is utilized in either catalyst production method to either bind the zeolite and matrix components in an incorporation method, or help bind the precursor microspheres in the in-situ method. Surprisingly, it has been found that significantly less binder is needed when the structured materials of this invention are used in the catalyst-forming process, whether by incorporation or in-situ.

The general procedure for manufacturing in-situ FCC microspheres is well-known in the art and can be followed from the procedure disclosed in U.S. Pat. No. 4,493,902. As disclosed therein, an aqueous slurry of reactive finely divided hydrous kaolin and/or metakaolin and metallic oxide material which forms the matrix such as the structured kaolin, structured alumina, mixtures thereof, as well as mixtures of structured and unstructured metallic oxides can be prepared. Any matrix kaolin present will have been calcined through its characteristic exotherm to spinel and/or mullite phases. During production, spray dried microspheres containing crystalline boehmite in the matrix are calcined. As a result of calcination, the crystalline boehmite is converted to a porous gamma phase and to a lesser extent a delta alumina. The BET surface area of this material only increases marginally, e.g., increases from 80 $m^2/g$ to 100 $m^2/g$. The aqueous slurry is then spray dried to obtain microspheres comprising a mixture of hydrous kaolin and/or metakaolin and structured matrix components. A moderate amount of sodium silicate can be added to the aqueous slurry before it is spray dried. During and after spray drying, the sodium silicate functions as a binder between the kaolin particles. Again, binder levels can be reduced, if not eliminated, using structured metallic oxides as matrix components. Thus, a typical binder level is about 12 wt. % based on total catalyst weight. Use of the structured components of this invention has been shown to reduce the need for a binder by at least half as that needed when the untreated materials are used.

The reactive kaolin of the slurry to form the microspheres can be formed of hydrated kaolin or calcined hydrous kaolin (metakaolin) or mixtures thereof. The hydrous kaolin of the feed slurry can suitably be either one or a mixture of ASP® 600 or ASP® 400 kaolin, derived from coarse white kaolin crudes. Finer particle size hydrous kaolins can also be used, including those derived from gray clay deposits, such as LHT pigment or Lustra. These kaolins have particle size distributions of from 80% to 90% finer than 2 microns. Purified water-processed kaolin clays from Middle Georgia have been used with success. Calcined products of these hydrous kaolins can be used as the metakaolin component of the feed slurry. Silicate for the binder is preferably provided by sodium silicates with $SiO_2$ to $Na_2O$ ratios of from 1.5 to 3.5 and especially preferred ratios of from 2.88 to 3.22.

A quantity (e.g., 3 to 30% by weight of the kaolin) of zeolite initiator may also be added to the aqueous slurry before it is spray dried. As used herein, the term "zeolite initiator" shall include any material containing silica and alumina that either allows a zeolite crystallization process that would not occur in the absence of the initiator or shortens significantly the zeolite crystallization process that would occur in the absence of the initiator. Such materials are also known as "zeolite seeds". The zeolite initiator may or may not exhibit detectable crystallinity by x-ray diffraction.

Adding zeolite initiator to the aqueous slurry of kaolin before it is spray dried into microspheres is referred to herein as "internal seeding". Alternatively, zeolite initiator may be mixed with the kaolin microspheres after they are formed and before the commencement of the crystallization process, a technique which is referred to herein as "external seeding".

The zeolite initiator used in the present invention may be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" shall mean a zeolite initiator that exhibits no detectable crystallinity by x-ray diffraction.

The seeds may be prepared as disclosed by in U.S. Pat. No. 4,493,902. Especially preferred seeds are disclosed in U.S. Pat. No. 4,631,262. Those skilled in this art are aware of current technologies in zeolite seed production. Such processes do not form part of the present invention.

In another specific embodiment of the invention, an aqueous slurry of finely divided hydrated kaolin, kaolin that has been calcined through its characteristic exotherm, boehmite and binder is prepared. Either or both the exothermic kaolin or boehmite can be structured in accordance with this invention. The boehmite is commercially available in powder or predispersed slurry forms. Powders can be anionically dispersed using dispersants such as Flowsperse®, FPolymers Inc., Cleveland, Ohio. Thus, the hydrous kaolin, calcined kaolin and boehmite, can be premixed in one tank and fed to the spray drier from one line. Binders which cause flocculation to the slurry are inline injected at the spray dryer to minimize the negative impact on slurry viscosity. Other mixing and injection protocols may also be useful. The final slurry solids are about 50 wt. %. The aqueous slurry is then spray dried to obtain microspheres comprising a silica bonded mixture of hydrated kaolin, boehmite and kaolin that has been calcined at least substantially through its characteristic exotherm (spinel, or mullite, or both spinel and mullite). The microspheres have average particle diameters that are typical of commercial fluid catalytic cracking catalysts, e.g., 65-85 microns. Suitable spray drying conditions are set forth in the '902 patent.

After spray drying, the microspheres may be calcined directly, or alternatively acid-neutralized to further enhance ion exchange of the catalysts after crystallization. The acid-neutralization process comprises co-feeding uncalcined, spray dried microspheres and mineral acid to a stirred slurry at controlled pH. The rates of addition of solids and acid are adjusted to maintain a pH of about 2 to 7, most preferably from about 2.5 to 4.5 with a target of about 3 pH. The sodium silicate binder is gelled to silica and a soluble sodium salt, which is subsequently filtered and washed free from the microspheres. The silica gel-bound microspheres are then calcined. By use of structured materials, and the need for less binders, if any, the cumbersome acid washing steps can be reduced, if not eliminated. In either case, calcination is done at a temperature and for a time (e.g., for two hours in a muffle furnace at a chamber temperature of about 1,350° F.) sufficient to convert any hydrated kaolin component of the microspheres to metakaolin, leaving the previously calcined kaolin components of the microspheres essentially unchanged. The resulting calcined porous microspheres comprise a mixture of metakaolin and kaolin clay calcined through its characteristic exotherm in which the two types of calcined kaolin are present in the same microspheres. Alternatively, any appropriate alumina can be added to or replace the kaolin calcined through the exotherm as previously described. Thus, calcined the microspheres should generally comprise about 25-60% by weight metakaolin and about 40-75% by weight kaolin that has been calcined through its characteristic exotherm. If alumina, such as structured boehmite is added, the calcined microspheres comprise about 30 to 70% by weight metakaolin, about 10 to 50% by weight spinel and/or mullite, and 10 to 40% by weight transitional phase alumina. Also present may be $Na_2O$ and $SiO_2$ derived from sodium silicate binder.

Y-faujasite is allowed to crystallize by mixing the calcined kaolin microspheres with the appropriate amounts of other constituents (including at least sodium silicate and water), as disclosed in U.S. Pat. No. 5,395,809, the teachings of which are herein incorporated by reference, and then heating the resulting slurry to a temperature and for a time (e.g., to 200°-215° F. for 10-24 hours) sufficient to crystallize Y-faujasite in the microspheres. The microspheres are crystallized to a desired zeolite content (typically ca. 50-65%), filtered, washed, ammonium exchanged, exchanged with rare-earth cations if required, calcined, exchanged a second time with ammonium ions, and calcined a second time if required.

After the crystallization process is terminated, the microspheres containing Y-faujasite are separated from at least a substantial portion of their mother liquor, e.g., by filtration. It may be desirable to wash to microspheres by contacting them with water either during or after the filtration step. Retained silica is controlled in the synthesis product to different levels. The silica forms a silica gel that imparts functionality for specific finished product applications.

The microspheres that are filtered contain Y-faujasite zeolite in the sodium form. Typically, the microspheres contain more than about 8% by weight $Na_2O$ and is proportional to the quantity of zeolite formed. To prepare the microspheres as active catalysts, a substantial portion of the sodium ions in the microspheres are replaced by ammonium or rare earth ions or both.

Ion exchange may be conducted by a number of different ion exchange methods. Preferably, the microspheres are first exchanged one or more times with an ammonium salt such as ammonium nitrate or sulfate solution at a pH of about 3. A typical design base exchange process would have multiple filter belts which process the product countercurrent to exchange solution flow. The number of equilibrium stages is determined by the total sodium to be removed and optimization of chemical cost. A typical process contains 3 to 6 equilibrium stages in each base exchange process. The ion exchange(s) with ammonium ions are preferably followed by one or more ion exchanges with rare earth ions at a pH of about 3. The rare earth may be provided as a single rare earth material or as a mixture of rare earth materials. Preferably, the rare earth is provided in the form of nitrates or chlorides. The preferred microspheres of the invention are ion exchanged to contain between 0% and 12% by weight REO, most preferably 1% to 5% by weight REO and less than about 0.5, more preferably, as low as 0.1% by weight $Na_2O$. As is well known, an intermediate calcination will be required to reach these soda levels.

After ion exchange is completed, the microspheres are dried. Many dryer designs can be used including drum, flash and spray drying. The procedure described above for ion exchanging the FCC microsphere catalysts of this invention is well-known and, as such, such process, per se, does not form the basis of this invention. The microspheres may be marketed either in a pure form or blended with other catalysts, additives and/or other blending agents.

The catalyst of the present invention, like all commercial fluid catalytic cracking catalysts, will be hydrothermally deactivated during the operation of the cracking unit. Accordingly, as used herein, the phrase "cracking the petroleum feedstock in the presence of a catalyst" shall include cracking the petroleum feedstock in the presence of the catalyst in its fresh, partially deactivated, or fully deactivated form.

The preferred catalyst of the invention comprises microspheres containing at least 40% and preferably from 50% to 65% by weight Y-faujasite, expressed on the basis of the as-crystallized sodium faujasite form of zeolite. As used herein, the term Y-faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing the specified crystallization mother liquor from the zeolite), of less than about 24.75 A as determined by the technique described in the ASTM standard method of testing titled "Determination of the Unit Cell Size Dimension of a Faujasite Type Zeolite" (Designation D3942-80) or by an equivalent technique. The term Y-faujasite shall encompass the zeolite in its sodium form as well as in the known modified forms, including, e.g., rare earth and ammonium exchanged forms and stabilized forms. The percentage of Y-faujasite zeolite in the microspheres of the catalyst is determined when the zeolite is in the sodium form (after it has been washed to remove any crystallization mother liquor contained within the microspheres) by the technique described in ASTM standard method of testing titled "Relative Zeolite Diffraction Intensities" (Designation D3906-80) or by an equivalent technique. It is important to equilibrate the microspheres carefully before X-ray evaluations are made since equilibration can have a significant effect on the results.

The catalyst of this invention which includes a zeolite cracking component may be used for cracking a variety of hydrocarbon feedstocks including crude petroleum, reduced crudes, vacuum tower residua, coker gas oils, cycle oils, FCC tower bottoms, vacuum gas oils, deasphalted residua and other heavy oils.

The catalytic cracking reaction temperature in accordance with the above-described process is at least about 900° F. (482° C.). The upper limit can be about 1100° F. (593.3° C.) or more. The preferred temperature range is about 950° F. to about 1050° F. (510° C. to 565.6° C.). The reaction total pressure can vary widely and can be, for example, about 5 to about 50 psig (0.34 to 3.4 atmospheres), or preferably, about 20 to about 30 psig (1.36 to 2.04 atmospheres). The maximum riser residence time is about 5 seconds, and for most charge stocks the residence time will be about 1.0 to about 2.5 seconds or less. For high molecular weight charge stocks, which are rich in aromatics, residence times of about 0.5 to about 1.5 seconds are suitable in order to crack mono- and di-aromatics and naphthenes which are the aromatics which crack most easily and which produce the highest gasoline yield, but to terminate the operation before appreciable cracking of polyaromatics occurs because these materials produce high yields of coke and $C_2$ and lighter gases. The length to diameter ratio of the reactor can vary widely, but the reactor should be elongated to provide a high linear velocity, such as about 25 to about 75 feet per second; and to this end a length to diameter ratio above about 20 to about 25 is suitable. The reactor can have a uniform diameter or can be provided with a continuous taper or a stepwise increase in diameter along the reaction path to maintain a nearly constant velocity along the flow path.

The weight ratio of catalyst to hydrocarbon in the feed is varied to affect variations in reactor temperature. Furthermore, the higher the temperature of the regenerated catalyst, the less catalyst is required to achieve a given reaction temperature. Therefore, a high regenerated catalyst temperature will permit the very low reactor density level set forth below and thereby help to avoid back mixing in the reactor. Generally catalyst regeneration can occur at an elevated temperature of about 1250° F. (676.6° C.) or more. Carbon-on-catalyst of the regenerated catalyst is reduced from about 0.6 to about 1.5, to a level of about 0.3 percent by weight. At usual catalyst to oil ratios, the quantity of catalyst is more than ample to achieve the desired catalytic effect and therefore if the temperature of the catalyst is high, the ratio can be safely decreased without impairing conversion. Since zeolitic catalysts, for example, are particularly sensitive to the carbon level on the catalyst, regeneration advantageously occurs at elevated temperatures in order to lower the carbon level on the catalyst to the stated range or lower. Moreover, since a prime function of the catalyst is to contribute heat to the reactor, for any given desired reactor temperature the higher the temperature of the catalyst charge, the less catalyst is required. The lower the catalyst charge rate, the lower the density of the material in the reactor. As stated, low reactor densities help to avoid back mixing.

EXAMPLE 1

In this example, the feed for a commercial calcined kaolin, used for example in a NaphthaMax® catalyst is used to demonstrate how the addition of ammonium polyphosphate liquid (11-37-0) to the spray dryer feed slurry can stabilize the mineral lattice and enhance calcined product hardness. The hydrous kaolin in this example exhibits a particle size distribution of 86 to 90% less than 1.0 micron (as measured by Sedigraph 5100/5120 particle size analyzer) and a BET surface area of 20.0 to 22.0 m$^2$/gm (Gemini 2370 surface area analyzer). 11-37-0 ammonium polyphosphate liquid was added at a rate of 0.50 weight percent P$_2$O$_5$ per dry ton of kaolin. The kaolin slurry concentration was in the 45 to 65% solids range.

The slurry was spray dried by a process equipped with a centrifugal atomizer. This method was selected for convenience. i.e. other drying methods would be equally effective with a goal to reduce product moisture to below 2.0 percent by weight (CEM Labwave 9000 moisture analyzer). The selected drying process yielded a bead average particle size (APS) of 65 to 75 microns as measured by laser particle size analysis (Microtrac SRA 150). The dried product was pulverized to a 5.0 Hegman Grind (ASTM D1210 Standard Test Method for Fineness of Dispersion of Pigment-Vehicle Systems by Hegman-Type Gage.) and then calcined in a muffle furnace capable of attaining and controlling clay bed temperatures as high as 2250° F. In this example, an electric muffle furnace was utilized with residence time under heat set at 1.0 hour. The calcined product was pulverized. In the tables below, the degree of product heat treatment is expressed as relative mullite index (M.I.). The value is derived by subjecting the calcined products to X-ray diffraction and measuring the mullite peak. The higher the M.I., the more intensively the product has been fired. To those experienced in the art and product applications, calcined kaolin fired to a 3.0 to 7.0 M.I. is considered "fully calcined".

TABLE 1

Untreated Calciner Feed

| Product MI | +325 Mesh Residue | Surface Area | PSD @ 2 | PSD @ 1 |
|---|---|---|---|---|
| 6.1 | 0.0136 | 11.27 | 56.6 | 37.2 |
| 11.7 | 0.0194 | 9.28 | 56.1 | 36.5 |
| 23.1 | 0.0229 | 7.7 | 53.1 | 28.1 |
| 30.6 | 0.0480 | 6.7 | 52.5 | 26.2 |
| 41.4 | 0.1798 | 6.26 | 50 | 23.2 |
| 52.9 | 0.1359 | 4.96 | 43.1 | 17.1 |

TABLE 2

Polyphosphate Treated Calciner Feed

| Product MI | +325 mesh Residue | Surface Area | PSD @ 2 | PSD @ 1 |
|---|---|---|---|---|
| 12.4 | 0.0158 | 10.9743 | 71.8 | 52.0 |
| 16.7 | 0.0169 | 10.2682 | 70.0 | 48.1 |
| 31.8 | 0.0237 | 8.7446 | 69.4 | 42.3 |
| 42.2 | 0.0869 | 8.2085 | 67.6 | 38.9 |
| 49.7 | 0.1202 | 8.4999 | 68.2 | 38.3 |

Of particular interest is the benefit of higher surface area maintenance as firing is intensified to increase the Mohs hardness/durability of the mineral matrix. Residue values (TAPPI Method T671) represent the weight percent of particles that are greater than 325 mesh in size.

EXAMPLE 2

The kaolin in this example is used to produce calcined intermediates for FCC catalysts and exhibited a particle size distribution of 86 to 90% less than 2.0 microns (as measured by Sedigraph 5120 particle size analyzer) and a BET surface area of 18.8 m$^2$/gm (Gemini 2370 surface area analyzer). 11-37-0 ammonium polyphosphate liquid was added in increasing increments of from 0.15 to 0.35 weight percent P$_2$O$_5$ per dry ton of kaolin. The kaolin slurry concentration to spray drying was in the 45 to 65% solids range. Apparent bulk density (ABD) is the weight per unit volume of a material, including voids that exist in the tested material. It can also be called Bulk Density and provides a measure of the "fluffiness" of a material in its supplied form. Tamped bulk density (TBD) measures the propensity of a kaolin to gradually pack more efficiently. This tendency was measured with a TAP-PACK Volumeter (ISO 787-11).

The structuring advantages brought about by the addition of polyphosphate to calcined kaolin feeds can also seen in mitigating changes in product bulk density as heat treatment is intensified. In Table 3, calcined product bulk density is shown as a function of degree of calcination expressed as relative mullite index (M.I.) as measured by a PANalytical CubixPro.

TABLE 3

| Sample ID | M.I. | ABD | TBD |
|---|---|---|---|
| 0.0% P2O5 | 20.8 | 0.19 | 0.40 |
|  | 30.9 | 0.19 | 0.4 |
|  | 40.7 | 0.2 | 0.42 |
|  | 49.2 | 0.22 | 0.44 |
| 0.15% P2O5 | 17.5 | 0.17 | 0.34 |
|  | 30.3 | 0.17 | 0.38 |
|  | 41.0 | 0.18 | 0.38 |
|  | 48.7 | 0.20 | 0.40 |
| 0.2% P2O5 | 22.0 | 0.17 | 0.35 |
|  | 31.2 | 0.19 | 0.36 |
|  | 37.6 | 0.18 | 0.38 |
|  | 50.8 | 0.2 | 0.4 |
| 0.25% P2O5 | 22.9 | 0.18 | 0.35 |
|  | 31.1 | 0.19 | 0.37 |
|  | 41.0 | 0.19 | 0.39 |
|  | 49.7 | 0.19 | 0.4 |
| 0.3% P2O5 | 22.8 | 0.19 | 0.35 |
|  | 31.0 | 0.19 | 0.36 |
|  | 37.6 | 0.2 | 0.4 |
|  | 50.0 | 0.19 | 0.41 |
| 0.35% P2O5 | 22.9 | 0.18 | 0.35 |
|  | 31.1 | 0.19 | 0.37 |

TABLE 3-continued

| Sample ID | M.I. | ABD | TBD |
|---|---|---|---|
| | 37.4 | 0.19 | 0.39 |
| | 50.0 | 0.18 | 0.41 |

EXAMPLE 3

In this example, a dispersed kaolin feed slurry was first treated with polyphosphate, then spray dried and calcined. The spray dried product moisture was again controlled to less than 2.0% by weight but the pulverization step before heat treatment was eliminated. This approach was used to assess the benefits of polyphosphate addition in stabilizing/strengthening the cohesiveness of a fired mineral structure. Ammonium polyphosphate liquid (11-37-0) was the source of the polyphosphate treatment. The kaolin starting material was a typical dispersed hydrous slurry exhibiting a particle size distribution as measured by Sedigraph 5120 of 86% less than 2.0 microns and a BET surface area of 18.0 to 22.0 $m^2/gm$. The slurry was treated with ammonium polyphosphate liquid to 0.50 and 1.0 percent by weight $P_2O_5$ and then spray dried to yield a bead average particle size (APS) of 65 to 75 microns as measured by laser particle size analysis. The spray dried beads were then calcined in a muffle furnace capable of attaining and controlling clay bed temperatures as high as 2250° F. In this example, an electric muffle furnace was utilized with residence time under heat set at 1.0 hour. Relative mullite index (M.I.) was used to measure degree of product heat treatment. An in-house Air Jet Attrition Index test (ASTM standard method D5757) was conducted. To be considered suitably attrition resistant, a maximum Air Jet Attrition Resistance Index of 3.0 was deemed necessary. To meet this hurdle, the untreated Control sample was calcined to a 31.0 M.I. The results are set forth in Table 4.

TABLE 4

| P2O5 Loading | Product M.I. | Air Jet Attrition Index |
|---|---|---|
| 0.0% | 31.0 | 2.46 |
| 0.50% | 27.0 | 1.84 |
| | 48.0 | 0.68 |
| 1.00% | 29.0 | 5.48 |
| | 50.7 | 2.70 |

The results from this study were unexpected. The addition of ammonium polyphosphate liquid at a 0.50% $P_2O_5$ treatment level clearly proved the viability of polyphosphate addition to stabilize/strengthen the cohesiveness of the fired mineral structure. With 1.0 percent by weight $P_2O_5$ addition, however, Air Jet Attrition results indicate that the increased degree of internal structuring from the polyphosphate reaction has offset its strengthening attributes. Firing the product treated with 1.0% $P_2O_5$ to a 50.7 M.I rectified the attrition resistance issue suggesting that the incremental molten silica expelled as spinel and converted to mullite migrated into the newly created structure strengthening the aggregate particle structure.

EXAMPLE 4

Analytical data for Examples 4-7 were determined using the following commercial instruments: Elemental analysis was completed using a Phillips XRF Model PW2400, Surface Area was measured using a Micromeritics TriStar or TriStar 2, Steaming or Deactivating FCC was completed in a specially designed furnace by CM and used 1500° F. saturated steam with a 4 hour exposure, Mercury pore volume was measured using a Micromeritics Autopore 4.

A commercially available boehmite alumina slurry produced by Tor corporation is delivered predispersed at >60% solids by weight for end use. The typical physical properties are set forth below:

| $Al_2O_3$ | |
|---|---|
| LOI | 20% max |
| Particle Size Distribution | |
| D50 | 1 micron |
| D90 | 7 micron |
| Surface area 70 $m^2/gm$ | 100 max |
| Crystal size of boehmite XRD- | 500 angstroms |
| Brookfield Viscosity- | 300-500 cp using #2 spindle, 20 rmp @65% solids |

This boehmite slurry was treated with a very small amount (0.15%) Ammonium Polyphosphate, (APP). The low shear viscosity of the slurry increased slightly, but not above practical limits for pumping and spray drying.

A kaolin slurry comprising a mixture of approximately 40-50% hydrous kaolin with 50-60% fully calcined kaolin having a mullite index >30% was formed. The kaolin slurry used in the example represented approximately 80% of the total mixture (dry basis). The APP treated and the control Tor alumina slurry was approximately 20% by weight of the total. The slurry mixture was adjusted to 51% solids by weight for spray drying.

When spray dried and calcined to 1500° F., product temperature in a commercial calciner, 1400° F. in a muffle furnace, the boehmite converts to gamma/delta alumina. Note in FIG. 1, only a small incremental change in macroporous structure (>1000 angstroms) was measured. The total pore volume increased marginally from 0.4396 cc/gm to 0.4553 cc/gm.

Similar tests in previous examples demonstrate when APP structuring is applied to kaolin, higher or lower APP addition levels can produce a range of pore volume, surface area, and particle size distributions which can be controlled using differing amounts of APP. This example focuses on structuring alumina and adding a non-structured kaolin slurry to the structured alumina.

The surface area of the Tor boehmite is approximately three to four times that of many commercial kaolin products. A resid product precursor is manufactured by blending a kaolin slurry and alumina (boehmite) slurry in approximately a 4/1 ratio by weight. The kaolin/alumina slurry was fed to a Niro rotary atomizer dryer and sodium silicate, 3.22 modulus, was used as the binding agent. Binder was injected and inline mixed with the slurry just upstream of the atomizer to minimize flocculation. The residence time between inline injections can vary from 5 to 15 seconds. The dried microspheres were calcined to metakaolin temperature conditions.

For evaluation purposes, three APP structured alumina microspheres were prepared. The binder addition level, as measured by % SiO2, was 0% and approximately 6% and 12%. The range was selected because the commercial Flex-Tec product without APP structured boehmite requires 12% binder to maintain physical properties and protect from degradation during handling in commercial equipment. The commercial precursor is acid washed after spray drying, filtered, washed, dried again and then calcined to metakaolin conditions.

Finished presursors in the commercial facilities are transported to a FCC synthesis facility for conversion to a finished FCC component. Attrition resistance of the precursor is critical for pneumatic conveying and other physical handling. A test which used the Roller Attrition Tester has been adapted for precursor strength. A typical result for the commercially produced precursor Roller would be less than 2. If the precursor Roller Attrition is higher than 2, the degradation of the precursor, as measured by stress strain analysis, is unsuitable for commercial use. The 0%, 6% 12% APP structured precursors had Roller values of 5.3, 1.6, and 0.6.

Figure 2:
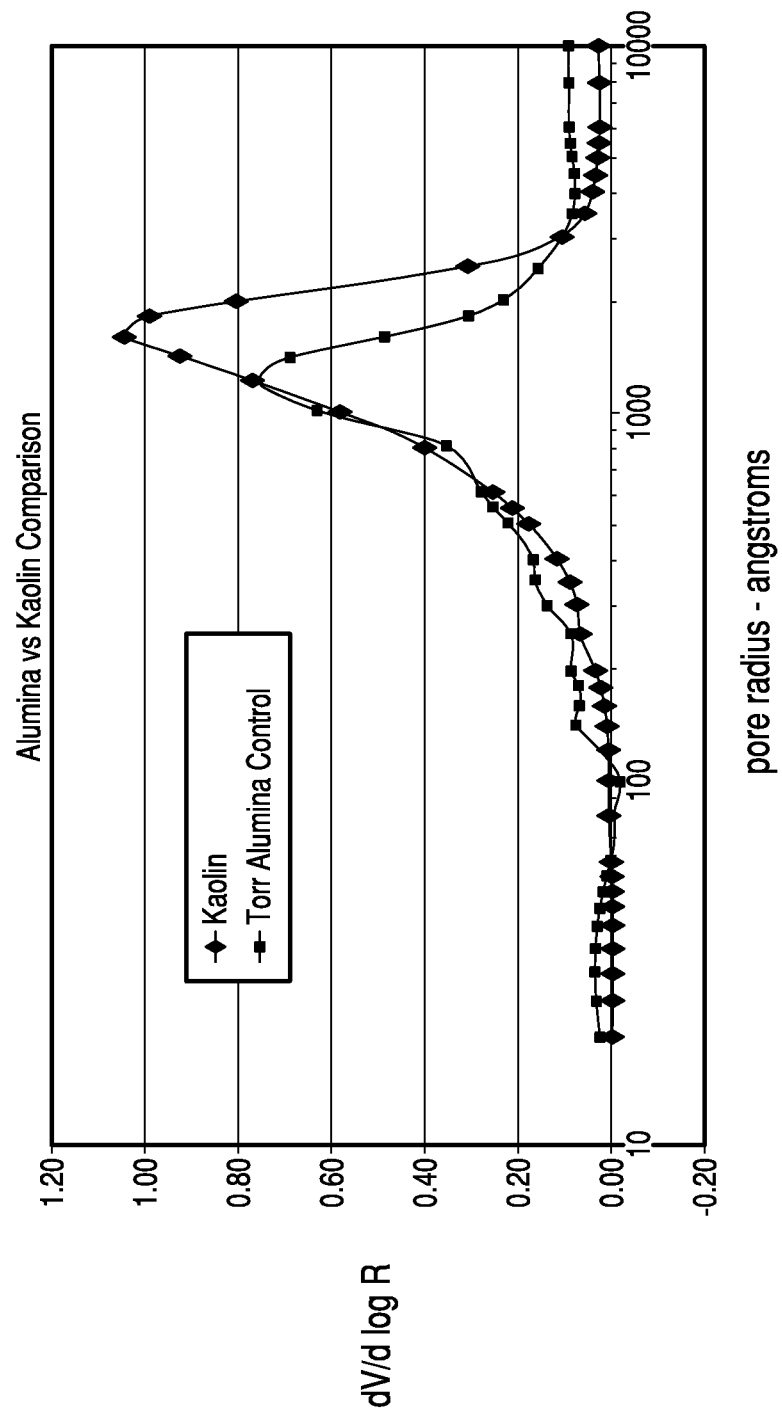
FIG. 2 is a graph illustrating the distribution of pore volume of boehmite versus kaolin.

FIG. 2 illustrates the difference in pore structure of kaolin and a typical commercial boehmite as disclosed above.

A kaolin slurry was prepared by mixing (dry weight basis) 43% tertiary hydrous kaolin with 57% fully calcined kaolin with 36% mullite to form a stable slurry of approximately 51% solids. The commercially produced high solids boehmite slurry, as above described was added to the kaolin slurry at 19% dry weight basis. The ratio is approximately 4/1 kaolin/boehmite. The solids were adjusted as needed for spray drying. The binding agent was 3.22 modulus sodium silicate which was in-line injected at the spray dryer atomizer in a concentration necessary to provide adequate strength to the precursor for conveying and other requirements and assist in pore volume control. A typical value is 12% by weight.

Generally, two variables are used to control pore volume. The level of binder can be increased but not decreased below the level the precursors are friable. The amount of reactive kaolin can be varied but changes to the zeolite to matrix (Z/M) ratio can impact cracked product selectivity. The complication within the two boundaries above is maintaining strength while having the right internal design or structure to achieve optimum diffusion in the FCCU, in particular short residence time design refineries, while maintaining the Z/M ratio to meet the selectivity needs of the refiners.

Figure 3:
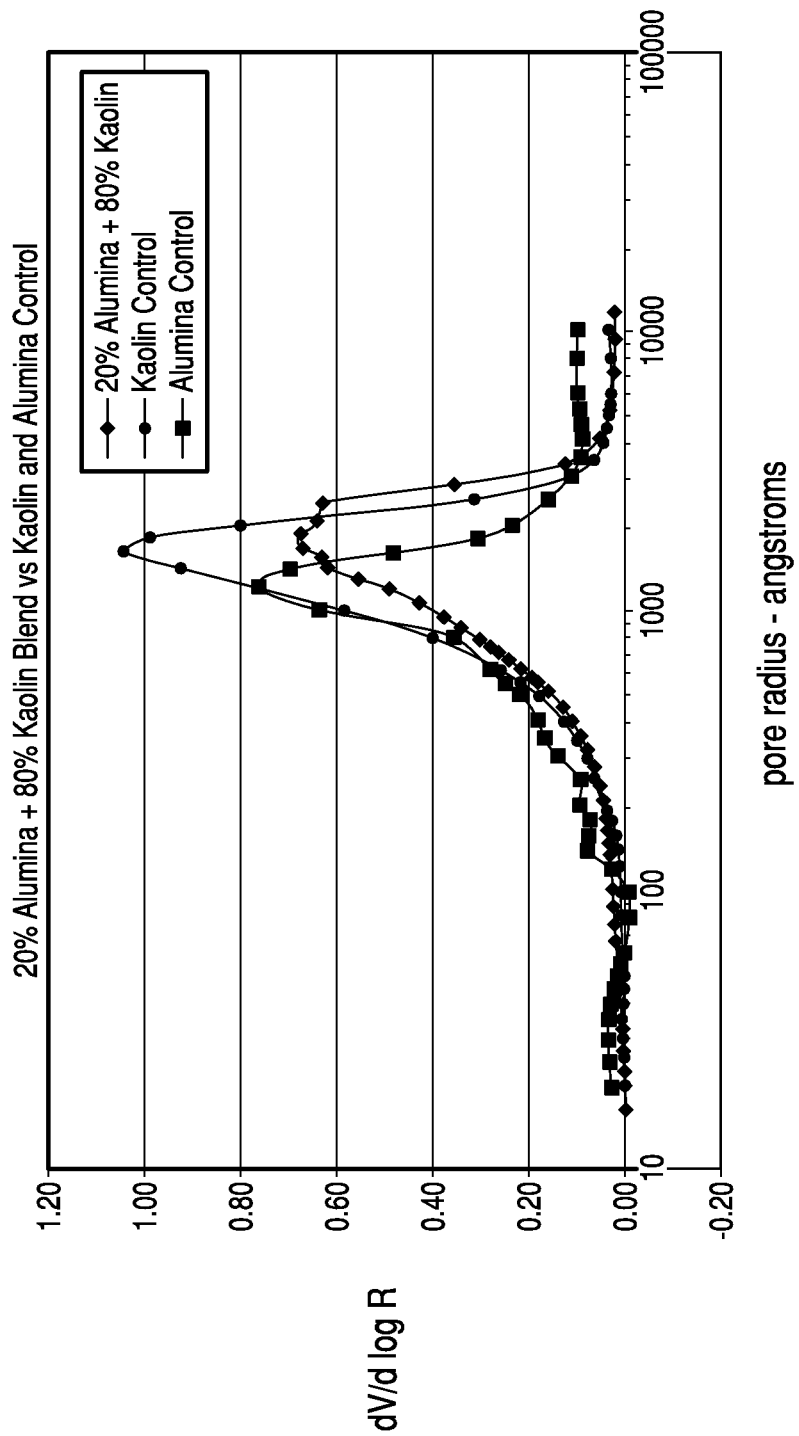
FIG. 3 is a graph illustrating the pore volume distribution of a mixture of structured boehmite and kaolin versus a kaolin control and a boehmite control.

When comparing the pore volumes of the kaolin and boehmite slurries and the pore volume of the blend, as shown in FIG. 3, the dominant peak of blend is very similar to the alumina.

Figure 4:
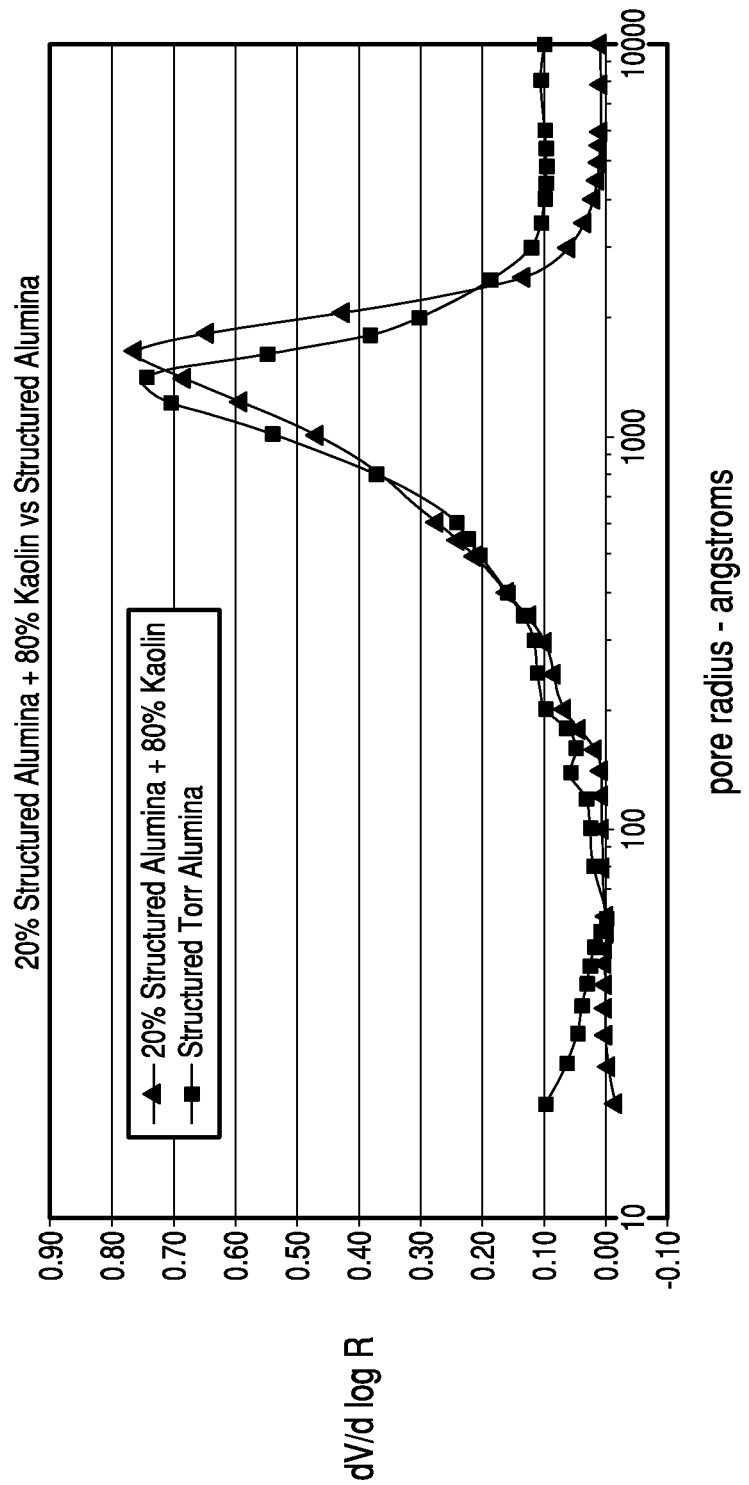
FIG. 4 is a graph illustrating the pore volume distribution of a mixture of structured boehmite and kaolin versus structured boehmite.

Structured alumina slurry, as above disclosed, was also blended with kaolin in the same 4/1 ratio, and compared with structured alumina. The results are shown in FIG. 4. Note from FIG. 4 that the dominant peak for the structured alumina and blend are very similar, while the large pore volume portion of the alumina slurry is eliminated in the blend, showing that the 4/1 kaolin/alumina mixture assumes the dominant structure of the alumina. This indicates thorough dispersion of the kaolin within the alumina structure. The purpose of the alumina is to trap metals such as vanadium and nickel and prevent zeolite deactivation. A more uniform dispersion suggests, as the catalyst wears during use, a uniform composition for more effective trapping should be achieved.

Figure 5:
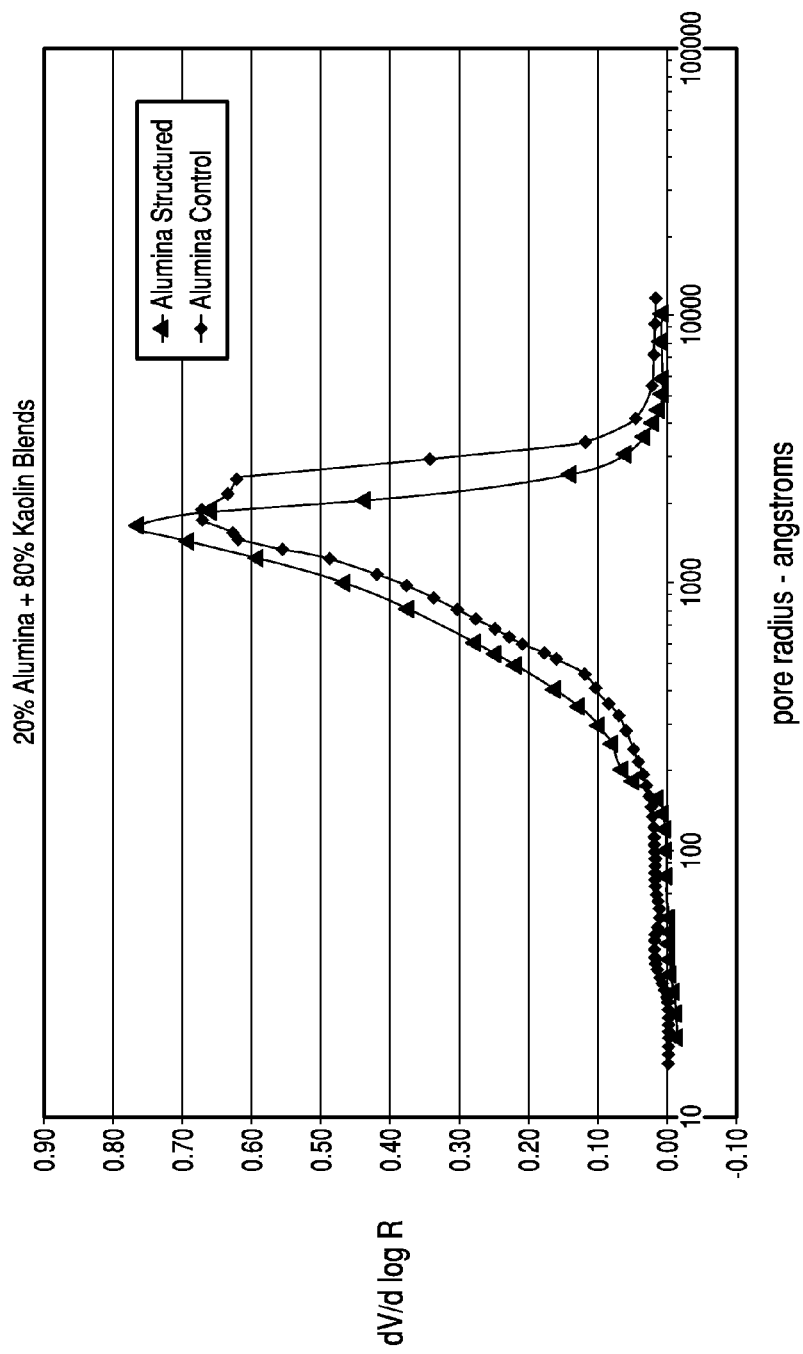
FIG. 5 is a graph of the pore volume distribution of a mixture of structured boehmite and kaolin versus a mixture of boehmite control and kaolin.

For comparative purposes is FIG. 5 showing the differences in the pore volume of the kaolin blends with structured and non-structured alumina. Note that the blend containing the structured product has a narrower distribution with additional volume in the 1000 angstrom pore radius rather than excess pore volume outside the key range for FCC selectivity.

EXAMPLE 5

The structured boehmite of Example 4 was mixed with the kaolin slurry noted above in Example 4 in the same ratios and composition. Tests were conducted to determine the minimum binder level to achieve mechanical strength for the precursor as indicated in Example 4. The precursor Roller tests determined that approximately 50% of the commercially produced product binder addition level (or 6% as measured by SiO2) was adequate to achieve a Roller less than 2.0. The spray dried precursor was calcined to metakaolin conditions (1500° F.) in preparation for zeolite synthesis.

Figure 6:
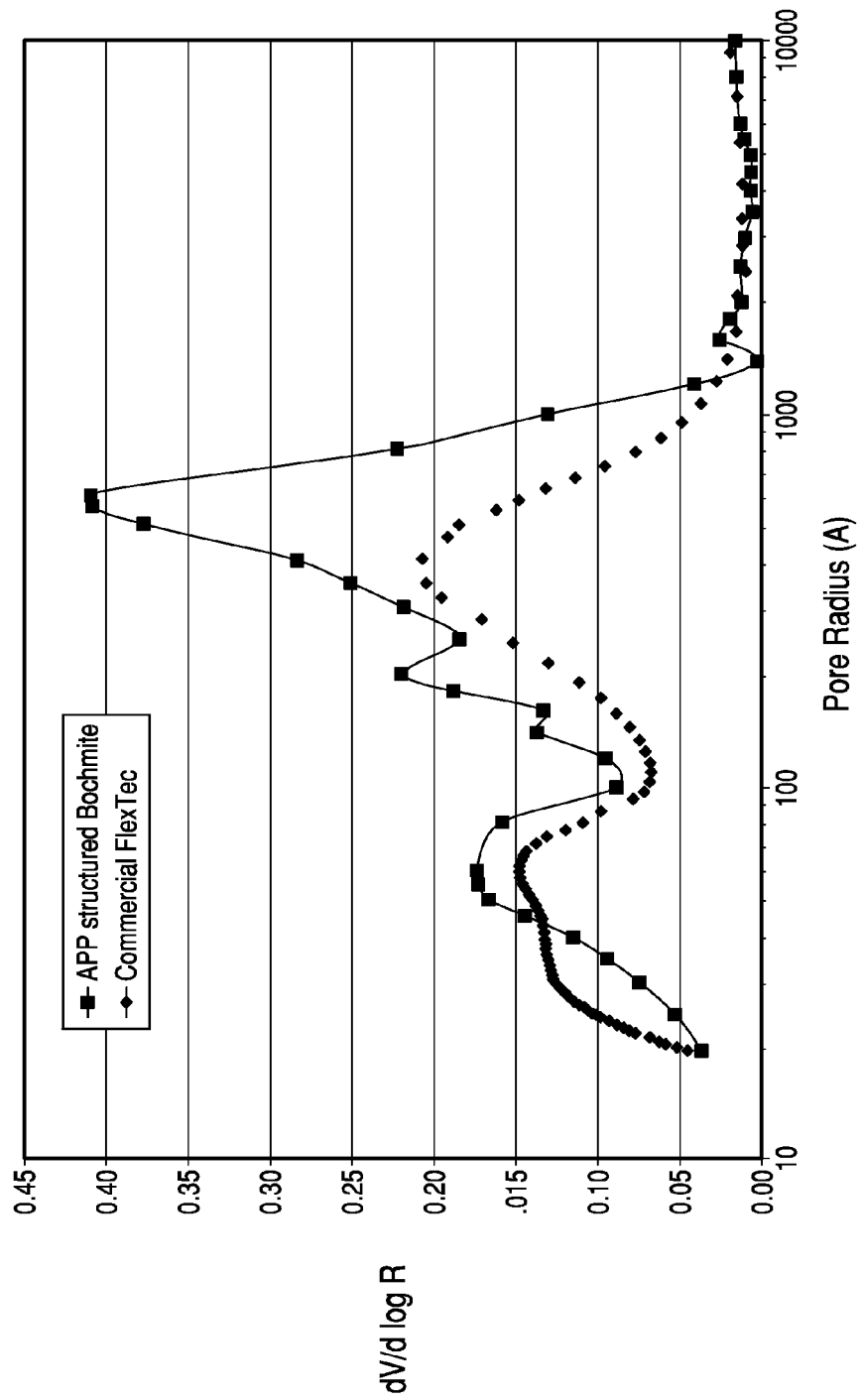
FIG. 6 is a graph comparing the pore volume distribution of a structured boehmite and a commercial catalyst which contains boehmite.

The synthesis product (Sodium Y Zeolite and Matrix) was base exchanged, calcined for sodium migration, based exchanged again, and calcined for zeolite stabilization. This is the process used for the commercial product manufacturing. The physical properties were compared to the commercial product and were comparable. The primary difference noted was the change in internal catalyst structure (mercury pore volume) as tested by a Micromeritics Autopore 4. The results of the pore volume tests are graphically shown in FIG. 6. The total pore volume increased from 0.22 cc/gm to 0.33 cc/gm or >40% more total pore volume. A key to understanding the value of the difference is at what pore radius the structure changed, not just the quantity.

There are two significant changes to the product using the structured boehmite. First, the microporosity (20-50 angstrom radius) is reduced. These pore structures are believed to "over crack" yielding hydrogen and other undesirable byproducts. The second major change is the increase in mesoporosity (50-300 angstrom radius) and macropores (300-1000 angstrom radius). Pores in this range are critical for diffusion and selectivity to gasoline and other desirable products.

Another testing parameter that is critical is the quality of the overall product when deactivated. Changes in both zeolite and matrix surface area can be measured. The deactivated (1500° F. steaming—4 hours) product had a steamed total surface area (STSA) retention of 56% and zeolite retention (SZSA) of 51%. This compares favorably to the commercial product. With equal zeolite and matrix stability and improved diffusion with increased pore volume in the critical pore radius range of 600 to 1000 angstroms, an improved FCC catalyst can be manufactured from the same raw materials using the same manufacturing process.

EXAMPLE 6

The same kaolin source/feedstock disclosed in Example 2 was treated with 0.15% APP and calcined in a muffle furnace to achieve a mullite concentration of approximately 35%, with a spinel phase of 65%. The calcined powder was then mixed with hydrous kaolin slurry of the same source in a dry weight ratio of 38% hydrous/62% calcined kaolin intermediate. The slurry solids of the mixture were adjusted to nominally 51% for spray drying. As disclosed in Example 4, in-line injection of a 3.22 modulus sodium silicate binder was made at the spray dryer atomizer to strengthen the FCC catalyst precursor for material handling. A control was also made using the same kaolin feedstock but the calcined intermediate was not treated with APP. The control and the APP treated product used 8% binding in order to compare the impact of the structuring on FCC zeolite synthesis efficiency, total pore volume, pore radius profile, and Roller attrition index.

This product precursor is designed to have added thereto a supplemental nutrient (pure metakaolin beads) to adjust and optimize the pore volume, zeolite and matrix surface area, and attrition resistance.

A Roller Attrition Index of less than 20 needs to be achieved for the FCC catalyst to have successful commercial performance. A Roller less than 10 reflects very good attrition resistance and less than 5 is excellent attrition characteristics.

The above control had a total pore volume with 9% supplemental nutrient of 0.252, the synthesis product had 516 square meters of total surface area (TSA) with 428 square meters of zeolite surface area (ZSA). The Roller attrition index for this product was 18. When the nutrient was reduced to 5% in order to increase the total pore volume, the TSA was reduced to 502 and ZSA to 413. The Roller attrition index was 27, unsuitable for commercial success. The total pore volume increased sharply as noted to 0.341.

The same composition catalyst precursor was prepared with the exception of 0.15% APP added to the calcined kaolin intermediate. Synthesis conditions were comparable in each test. The 9% nutrient supplement APP treated precursor had very similar total pore volume to the control, 0.252 vs. 0.258. The APP treated sample did show differences in other critical performance criteria. The sodium Y synthesis product TSA increased to 526 and ZSA to 441 vs. 516/428, a measureable improvement. In addition, the Roller Attrition Index also improved from 18 to 6.

In order to explore the sensitivity of physical properties of the catalyst, the APP treated sample was also tested at 5% nutrient addition. The pore volume also increased, however the synthesis product TPV was 0.288 vs. 0.341 for the control sample without APP. The negative impact on surface was marginal 521 TSA and 434 ZSA vs. 526/441. The Roller attrition index only increased from 6 to 9 in the APP treat product.

EXAMPLE 7

Manufacturing processes for FCC catalysts require binders for incorporated as well as in-situ based products. The application of binder chemistry differs due to the processing method but many binders contain sodium. In-situ catalyst products add binders in the preparation of the microsphere precursors. These binders are sodium silicate species of different silica/sodium ratio's but generally are 3.22 or 2.88. When the microsphere requires large quantities of binder for precursor green strength or pore volume control, the excess sodium provides challenges in the downstream processing. This is particularly problematic for very low sodium finished FCC components. Similar problems may arise in incorporated catalyst manufacturing when silica sol binders are used which also contain significant quantities of sodium. A typical preparation process overview for a silica sol is provided below.

Using water, a 3.22 sodium silicate is diluted under shear to a specific gravity range of 1.18 to 1.20. Water, Sulfuric Acid and Alum are mixed under high shear with flow ratio control to achieve a composition comprising 2% $Al_2O_3$ and a free acid of 14% by weight.

The two slurries are mixed under high shear conditions. The general ratio of the two components is 3-4 parts diluted sodium silicate to 1 part acidic alum. The actual process addition rates are controlled by pH from 2.4 to 2.9 during mixing. The mixture flows to a highly agitated storage tank. The sol reaction proceeds and the pH increases to approximately 3.2 during aging. The sol is made in small batches due to a relatively low shelf life.

After mixing the other catalyst ingredients with the binder, spray dried products for both incorporated and in-situ catalysts may contain sodium up to or potentially greater than 4% by weight. This high level of non-zeolitic sodium often results in exchange challenges in that after calcination the excess sodium is "locked" into the microsphere structure. High quantities of chemicals are necessary to remove this byproduct of the binding process by base exchange. To mitigate this complication in the manufacturing process, a process which can be referred to as "acid washing" is frequently employed. The spray dried product is mixed with a dilute acid, sulfuric or other commercial acids, to form an acidic slurry generally with a pH of approximately 3. This may vary due to the binder species and or quantity of acid required for a sodium sulfate salt or similar material. A pH below three in a catalyst containing Zeolite Y may result in dealumination or destruction of the zeolite. The acidified microsphere slurry is filtered and the salt solution is washed using filter belts. The process will reduce the total sodium content sufficiently in the matrix for more facile base exchange in the crystallized intermediate. A typical value would be less than 1%.

As shown in above Examples 3 and 6, adequate green strength and improved finished FCC product attrition is achieved using APP. By reducing the amount of binder required for pore volume control, attrition, or a combination of the two, the need for acid washing may be eliminated. The acid washing and subsequent drying steps are fairly expensive in the overall process, approximately 5% or more of the total manufacturing cost.

In Example 5, the produced resid catalyst, was used as a comparative example for pore volume optimization. The commercial manufacturing process for this catalyst required acid washing as described above to achieve the finished product sodium level of 0.2% by weight. Below is the results of the physical product testing of one experimental finished product catalyst from that example. This product was processed to finished product without "acid washing" and used 6% Sodium Silicate binder to form the microsphere. The kaolin slurry used in this example was mixed with 0.15% APP structured boehmite alumina, as noted.

FP (finished product with APP structured boehmite and 6% 3.22 modulus Sodium Silicate as measured by SiO2) properties are shown below.

| FP | |
|---|---|
| Na2O | 0.19 |
| % RE | 2.97 |
| TSA | 368 |
| MSA | 90 |
| ZSA | 278 |
| STSA | 207 |
| SMSA | 64 |
| SZSA | 143 |
| HgPV | 0.3285 |
| Roller | 19 |

The table below (data for FIG. 6) clearly shows the shift in pore volume (cc/gm) of the APP treated boehmite, in the three key pore radius ranges for FCC. The mesoporosity, 300-600 angstrom radius and the macroporosity 600-10000 angstrom radius, which are critical to improve FCC diffusion and selectivity, are substantially improved.

| Pore Radius Angstroms | APP Structured Boehmite 6% Binder | Commercial Resid Catalyst |
|---|---|---|
| 20-300 | 0.1571 | 0.1271 |
| 300-600 | 0.0962 | 0.0694 |
| 600-10000 | 0.0752 | 0.0331 |
| Total Pore Volume cc/gram | 0.3285 | 0.2296 |

Steaming a catalyst at 1500° F. for 4 or more hours is a method used to simulate deactivated or equilibrium catalyst physical properties from a refinery. The steamed catalyst is then activity tested to confirm selectivity, conversion and byproduct generation. The steam retention of this catalyst is >50% zeolite and >55% for both zeolite and matrix. This performance is equal to or better than the commercially produced catalyst cited in Example 5.

Another benefit of APP structuring for kaolin is the co-catalyst used in Example 3. This product is blended with an active component to facilitate bulk density or fluidization requirements, as well as low attrition. The current commercial co-catalyst is produced with a silica sol binder described above and required acid washing to reduce sodium. Sodium in any component of the finished catalyst or catalyst and co-catalyst blend is believed to "migrate" or move within the mixture of particles and reduces the hydrothermal stability of the FCC catalyst, and impacts performance and selectivity. The APP structured product co-catalyst in the example has improved attrition resistance when compared to the commercial co-catalyst. The use of APP can also provide a potential to customized bulk density, if needed for specific refineries, without substantial penalty in attrition properties.

The invention claimed is:

1. A catalyst particle comprising 1) a matrix comprising a modified metallic oxide, wherein a structuring agent comprising fertilizer grade ammonium polyphosphate mixes with a metallic oxide having a first crystalline phase, and said polyphosphate modifies said metallic oxide through heating and said modified metallic oxide is in a second crystalline phase; 2) zeolite or zeolite precursor, wherein said catalyst particle has a diameter of about 20 to 200 microns, and when zeolite precursor is present, zeolite is formed from said precursor.

2. The catalyst of claim 1, wherein the mixture of said metallic oxide and said structuring agent comprises from 0.01 to 5 wt. % of polyphosphate as $P_2O_5$ relative to the amount of said metallic oxide.

3. The catalyst of claim 2, wherein the mixture of said metallic oxide and said structuring agent comprises 0.01 to 2 wt. % of polyphosphate as $P_2O_5$ relative to said metallic oxide.

4. The catalyst of claim 3, wherein the mixture of said metallic oxide and said structuring agent comprises 0.01 to 0.5 wt. % of polyphosphate as $P_2O_5$ relative to said metallic oxide.

5. The catalyst of claim 1, wherein the mixture of said metallic oxide and said structuring agent is heated to a temperature of at least about 350° F.

6. The catalyst of claim 1, wherein said metallic oxide is hydrous kaolin, the mixture of hydrous kaolin and said structuring agent is heated to a temperature such that the hydrous kaolin is converted to metakaolin which reacts with said polyphosphate, and the reacted metallic oxide is heated to a temperature beyond the characteristic exotherm of said kaolin to form a spinel phase.

7. The catalyst of claim 6, wherein the reacted metallic oxide is heated to a temperature beyond the characteristic exotherm of kaolin to form a mullite phase.

8. The catalyst of claim 7, wherein the reacted metallic oxide is heated to a Mohs hardness of greater than 4.5

9. The catalyst of claim 1, wherein said metallic oxide comprises alumina.

10. The catalyst of claim 9, wherein said alumina comprises boehmite.

11. The catalyst of claim 10, wherein the reacted metallic oxide is heated to a temperature to convert at least a portion of said boehmite to a gamma alumina phase.

12. The catalyst of claim 1, wherein said metallic oxide is boehmite and said matrix further comprises calcined kaolin.

13. The catalyst of claim 1, wherein said zeolite is incorporated in said catalyst.

14. The catalyst of claim 1, wherein said zeolite is grown in-situ in said catalyst from said zeolite precursor.

15. A method of cracking a hydrocarbon feedstock comprising contacting a hydrocarbon feedstock under FCC conditions with the catalyst of claim 1.

16. The method of claim 15, wherein said zeolite is grown in-situ in said catalyst from said zeolite precursor.

17. The method of claim 16, wherein said metallic oxide is hydrous kaolin, the mixture of hydrous kaolin and said structuring agent is heated to a temperature such that the hydrous kaolin is converted to meta kaolin, which reacts with said polyphosphate, and the reacted metallic oxide is heated to a temperature beyond the characteristic exotherm of kaolin to form a spinel phase.

18. The method of claim 17, wherein said reacted metallic oxide is heated to a temperature beyond the characteristic exotherm of said kaolin to form a mullite phase.

19. The method of claim 18, wherein the reacted metallic oxide is heated to a Mohs hardness of greater than 4.5.

20. The method of claim 16, wherein said metallic oxide is boehmite and said catalyst further comprises calcined kaolin.

21. The method of claim 20, wherein said feedstock includes a resid.

* * * * *